US005944305A

United States Patent [19]

Takashima et al.

[11] Patent Number: 5,944,305

[45] Date of Patent: Aug. 31, 1999

[54] DRIVE TRANSMITTING DEVICE, SHEET FEEDING DEVICE AND IMAGE FORMING APPARATUS

[75] Inventors: Kazunori Takashima, Mishima; Masao Amano, Susono, both of Japan

[73] Assignee: Canon Kabushiki Kaisha, Tokyo, Japan

[21] Appl. No.: 09/014,996

[22] Filed: Jan. 28, 1998

[30] Foreign Application Priority Data

Jan. 30, 1997 [JP] Japan .................................... 9-016484

[51] Int. Cl.[6] ............................. B65H 1/08; F16H 55/17; F16H 55/12; F16H 55/06

[52] U.S. Cl. .......................... 271/127; 271/118; 271/147; 74/435; 74/448; 74/462

[58] Field of Search ................................ 271/10.13, 114, 271/116, 118, 126, 127, 147; 74/411.5, 435, 448, 462

[56] References Cited

U.S. PATENT DOCUMENTS

| | | | |
|---|---|---|---|
| 223,806 | 1/1880 | Hodges | 74/435 X |
| 409,149 | 8/1889 | Kaiser | 74/462 |
| 2,559,619 | 7/1951 | Henderson | 74/435 |
| 5,386,983 | 2/1995 | Ando | 271/118 |
| 5,579,098 | 11/1996 | Noguchi et al. . | |
| 5,595,287 | 1/1997 | Niklaus | 74/462 X |

FOREIGN PATENT DOCUMENTS

| | | |
|---|---|---|
| 6-050406 | 2/1994 | Japan . |
| 6-50406 | 2/1994 | Japan . |
| 8-226517 | 9/1996 | Japan . |
| 2 195 614 | 4/1988 | United Kingdom . |

*Primary Examiner*—William E. Terrell
*Assistant Examiner*—Kenneth W. Bower
*Attorney, Agent, or Firm*—Fitzpatrick, Cella, Harper & Scinto

[57] ABSTRACT

A drive transmitting device having a partly untoothed gear partly having an untoothed portion, and a driven gear capable of meshing which the partly untoothed gear, and transmitting rotation from the partly untoothed gear to the driven gear is characterized in that in the partly untoothed gear, of a predetermined number of continuous teeth positioned on a side on which the partly untoothed gear starts to mesh which the driven gear when it rotates from a state in which the untoothed portion and the driven gear are opposed to each other, the odd teeth from the untoothed portion side are formed with odd tooth inclined surfaces cut away from the tooth top of the front tooth surface in the direction of rotation of the partly untoothed gear toward the root of the rear tooth surface, and the even teeth are formed with even tooth inclined surfaces cut away from the root of the front tooth surface in the direction of rotation toward the tooth top of the rear tooth surface.

17 Claims, 15 Drawing Sheets

DRIVE TRANSMITTING DEVICE, SHEET FEEDING DEVICE AND IMAGE FORMING APPARATUS

BACKGROUND OF THE INVENTION

1. Field of the Invention

This invention relates to a drive transmitting device for transmitting a drive force from a drive source such as a motor as required, and a sheet feeding device using the drive transmitting device.

2. Related Background Art

In a sheet feeding device used in an image forming apparatus or the like, a drive force from a drive source such as a motor is received to effect the rotation of a paper feeding roller and the vertical rocking of an intermediate plate on which sheets are piled. In this case, in order to effect the transmission of the drive force at predetermined timing as required, a drive transmitting device for selectively transmitting or not transmitting the drive force is provided in the course of the transmission route of the drive source between the drive source and the sheet feeding device.

As this drive transmitting device, there has heretofore been one using a partly untoothed gear having an untoothed portion having some of the teeth of the gear deleted. An example of the drive transmitting device using such partly untoothed gear will hereinafter be described with reference to FIG. 16 of the accompanying drawings.

The reference numeral 100 designates a drive transmitting device for selectively transmitting a drive force from a drive source, not shown, and the drive transmitting device 100 has a partly untoothed gear 102 and a driving gear 104 capable of meshing with this partly untoothed gear 102.

The driving gear 104 is connected to the drive source and is always rotated. The partly untoothed gear 102 is rotatively biased in a counter-clockwise direction as viewed in FIG. 16 by the resilient force of a coil spring 106. There is provided a solenoid 108 for stopping the partly untoothed gear 102 against the resilient force of the coil spring 106 in a position wherein the untoothed portion 102*a* of the partly untoothed gear 102 is opposed to the driving gear 104 (the state shown in FIG. 16). When this solenoid 108 is excited, an arm 108*a* moves from a position indicated by solid line in which it is engaged with the engagement portion 102*b* of the partly untoothed gear 102 to a position indicated by dots-and-dash line and the engagement is released, and the partly untoothed gear 102 is rotated by the coil spring 106 and comes into meshing engagement with the driving gear 104, whereby a drive force is transmitted from the driving gear 104 to the partly untoothed gear 102.

To make the meshing engagement at the start of the meshing engagement between the partly untoothed gear 102 and the driving gear 104 good, there is the technique disclosed in Japanese Patent Application Laid-open No. 6-50406.

This is a technique whereby in FIG. 16, the first tooth of the partly untoothed gear 102 which first meshes with the driving gear 104 is formed with an odd tooth inclined surface T1 cut away from the root of the front tooth surface in the direction of rotation toward the tooth top of the rear tooth surface, and the second tooth is formed with an even tooth inclined surface T2 cut away from the tooth top of the front tooth surface toward the root of the rear tooth surface.

By this construction, if the tooth tops of the gears are synchronized with each other (the tooth tops contact with each other) when in order to transmit the drive force from the driving gear 104 to the partly untoothed gear 102, the partly untoothed gear 102 is rotated by the coil spring 106 and comes into meshing engagement with the driving gear 104, a tooth of the driving gear 104 bears against the odd tooth inclined surface T1 of the tooth or the inclined surface T2 of the second tooth, of the partly untoothed gear 102, to thereby somewhat delay or quicken the rotation of the partly untoothed gear 102, whereby the meshing engagement between the tooth is reliably effected.

The above-described device according to the prior art, however, is good when the drive force is to be transmitted from the driving gear 104 side to the partly untoothed gear 102 side, but when the drive is to be transmitted from the partly untoothed gear 102 to the driving gear 104, the rotation of the partly untoothed gear 102 can not be delayed or quickened and therefore, there has arisen the problem that when the tooth tops contact with each other, a shock noise is produced or the tooth tops are damaged.

SUMMARY OF THE INVENTION

The present invention has been made in view of the above-noted problem and has as its object to make the starting of meshing engagement between teeth when in a drive transmitting device provided with a partly untoothed gear, drive is transmitted from the partly untoothed gear to a gear good.

The present invention provides a drive transmitting device comprising a partly untoothed gear having a partly having an untoothed portion and a drive gear capable of meshing with the partly untoothed gear, and transmitting rotation from the partly untoothed gear to the driven gear, characterized in that in the partly untoothed gear, of a predetermined number of continuous teeth positioned on a side on which the partly untoothed gear starts to mesh with the driven gear when it rotates from a state in which the untoothed portion and the driven gear are opposed to each other, the odd teeth from the untoothed portion side are formed with odd tooth inclined surfaces cut away from the tooth top of the front tooth surface in the direction of rotation of the partly untoothed gear toward the root of the rear tooth surface, and the even teeth are formed with even tooth inclined surfaces cut away from the root of the front tooth surface in the direction of rotation toward the tooth top of the rear tooth surface.

Also, the present invention provides a drive transmitting device comprising a partly untoothed gear partly having an untoothed portion, and a driven gear capable of meshing with the partly untoothed gear, and transmitting portion from the partly untoothed gear to the driven gear, characterized in that in the partly untoothed gear, of a predetermined number of continuous teeth positioned on a side on which the partly untoothed gear starts to mesh with the driven gear when it rotates from a plate in which the portion and the driven gear are opposed to each other, the even teeth from the untoothed portion side are formed with even tooth inclined surfaces cut away from the root of the front tooth surface, and the teeth of the driven gear are formed with driven tooth inclined surfaces cut away from the root of the front tooth surface in the direction of rotation toward the tooth top of the rear tooth surface.

DESCRIPTION OF THE PREFERRED EMBODIMENTS

Figure 1:
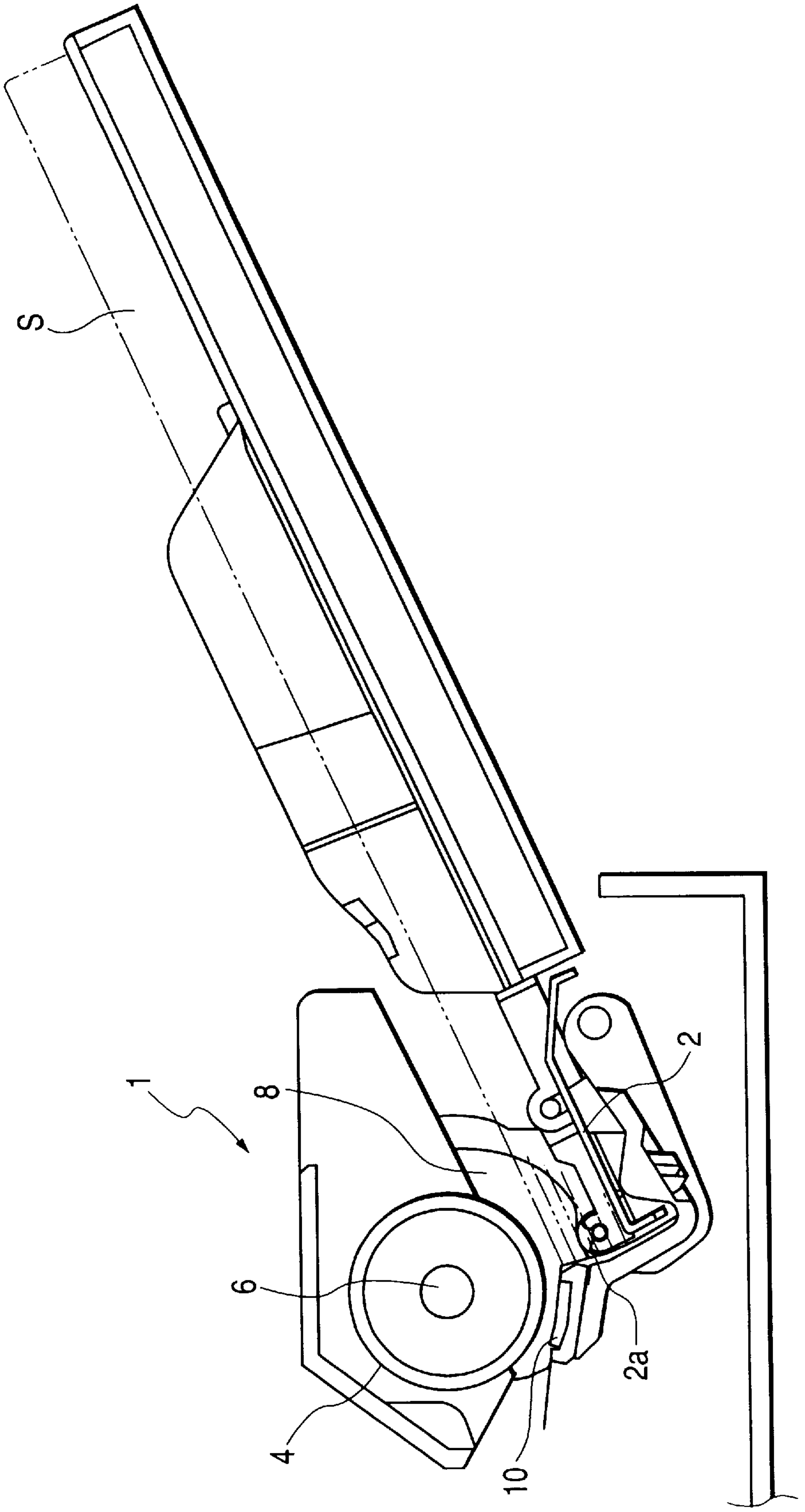
FIG. 1 is a cross-sectional view showing an embodiment of the sheet feeding device of the present invention.
Figure 2:
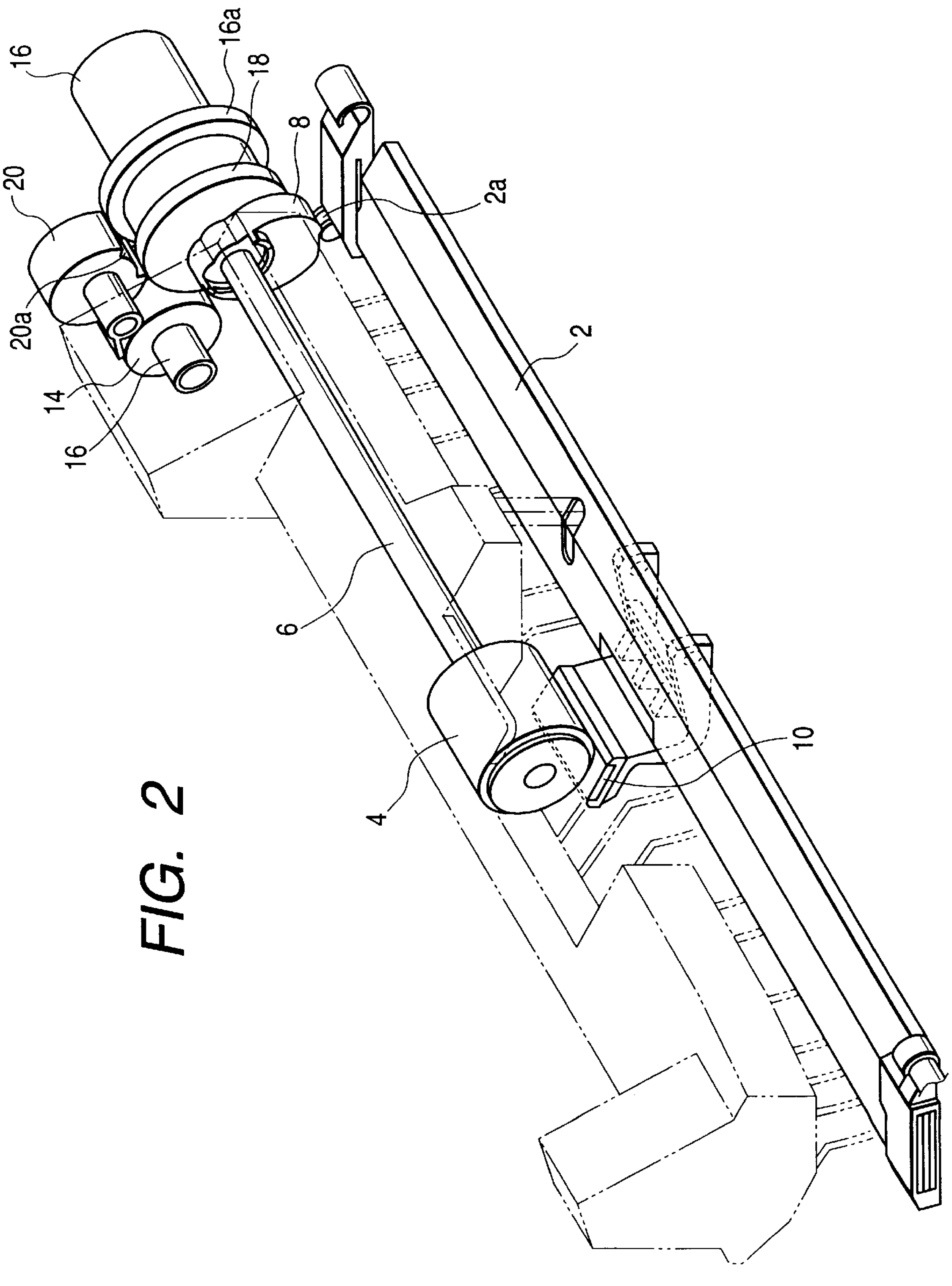
FIG. 2 is a perspective view of the sheet feeding device of the present invention.

A sheet feeding device provided with the drive transmitting device of the present invention will first be described with reference to FIGS. 1 and 2.

Reference numeral 2 designates an intermediate plate supporting a sheet S thereon and rockably supported and biased toward a paper feeding roller 4 side by a paper feeding spring, not shown. The paper feeding roller 4 is mounted on a paper feeding shaft 6, and the paper feeding shaft 6 is rotated, whereby the paper feeding roller 4 feeds the sheet S supported on the intermediate plate 2. A cam 8 rotated by the drive transmitting device which will be described later is in frictional contact with a roller 2*a* provided on the intermediate plate 2, and the cam 8 is rotated, whereby there is brought about a standby state in which the intermediate plate 2 is lowered against the resilient force of the paper feeding spring and does not effect paper feeding (the state of FIG. 1).

Reference numeral 10 denotes a separating pad provided so as to be capable of being urged against the paper feeding roller 4, and the separating pad 10 separates the sheets fed by the paper feeding roller 4 one by one.

Figure 3:
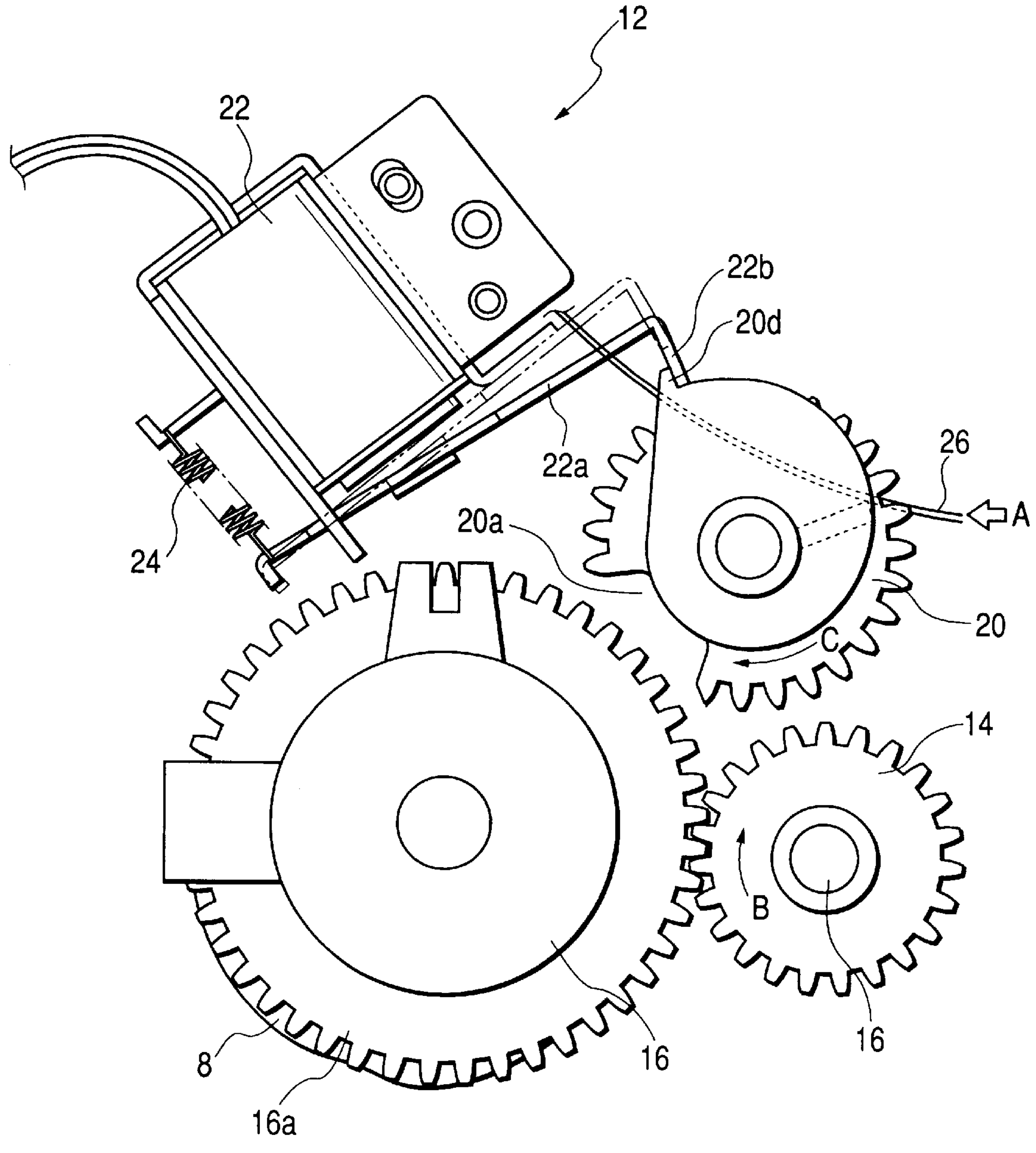
FIG. 3 is a front view showing an embodiment of the drive transmitting device of the present invention.
Figure 4:
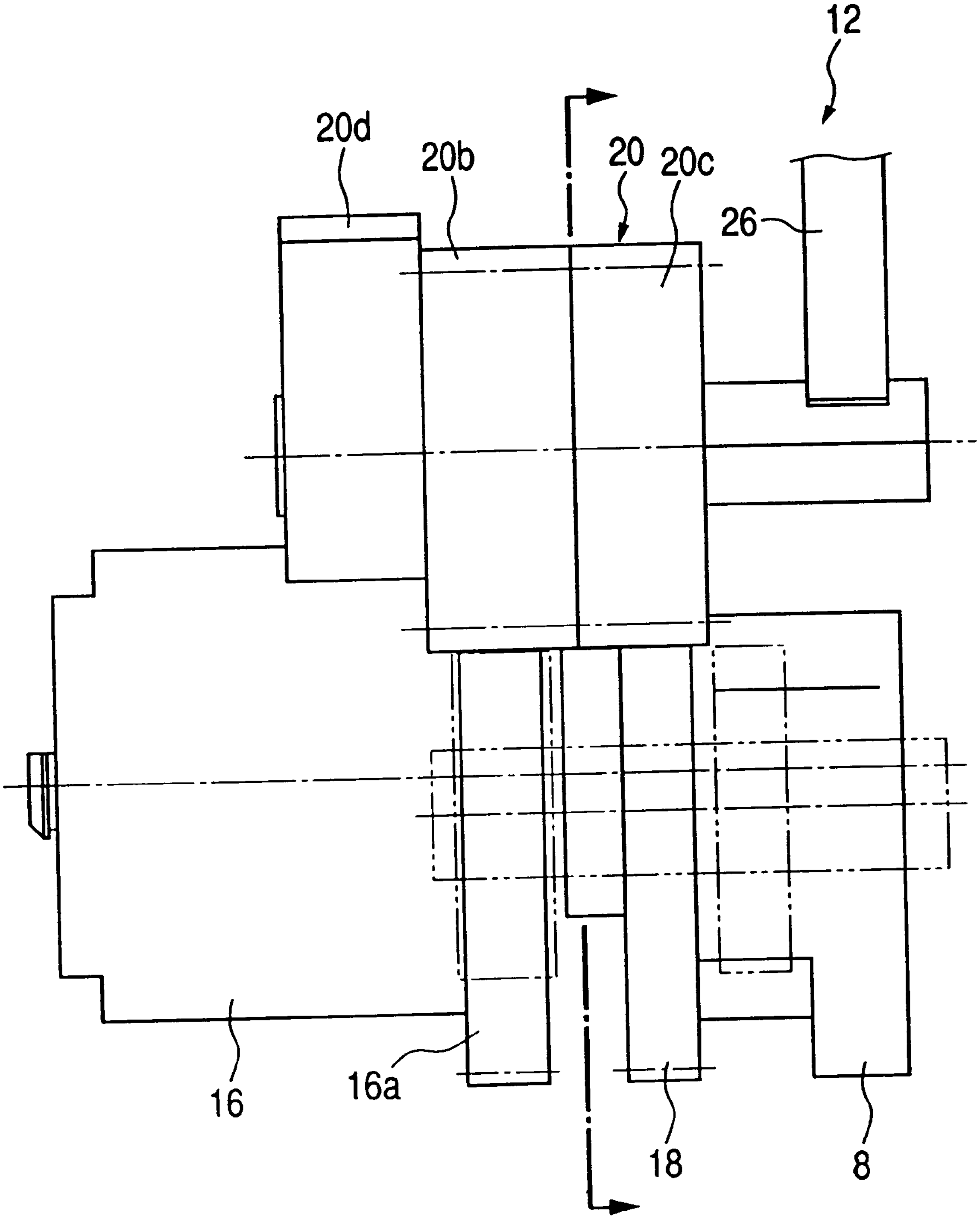
FIG. 4 is a view taken along the arrow A of FIG. 3.
Figure 5:
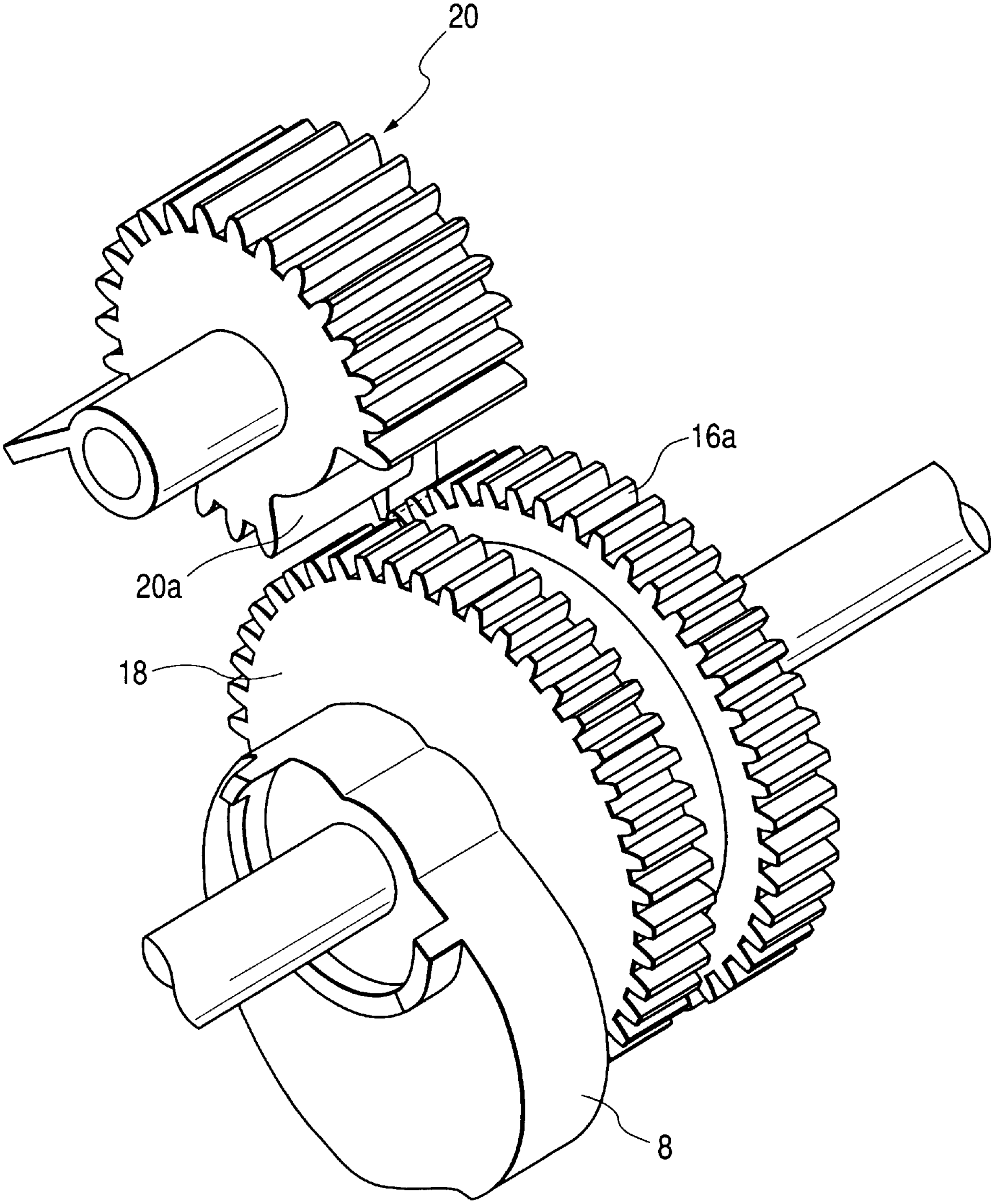
FIG. 5 is a perspective view of the gear train of the drive transmitting device of FIG. 3.
Figure 6:
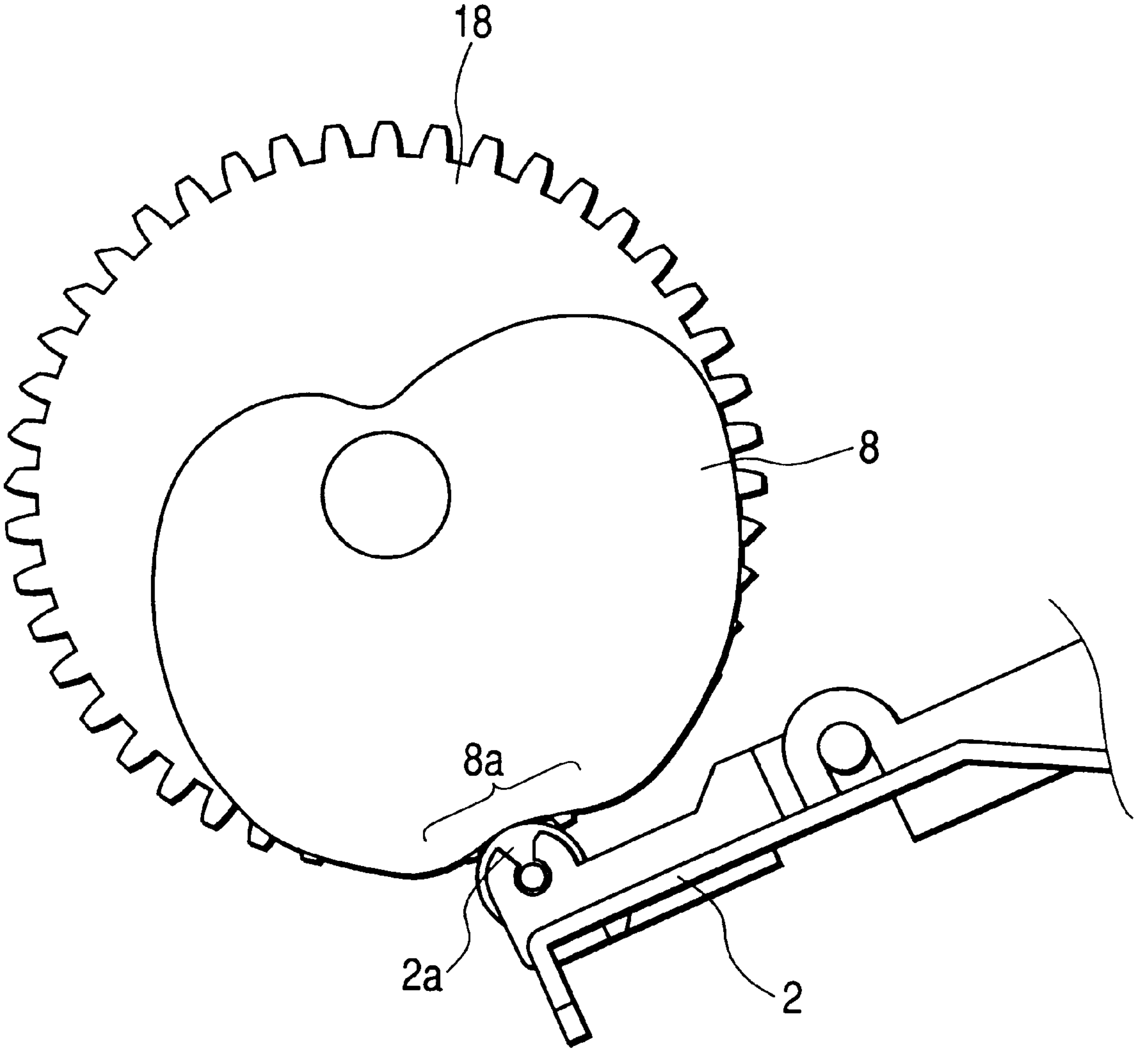
FIG. 6 shows the shape of a cam provided on the cam gear of FIG. 3.

The drive transmitting device 12 for controlling the rotation of the paper feeding roller 4 and the cam 8 will now be described with reference to FIGS. 3 to 6. FIG. 3 is a front view of the drive transmitting device 12, FIG. 4 is a view taken along the arrow A of FIG. 3, FIG. 5 is a perspective view showing the details of a gear train, and FIG. 6 shows the shape of the cam 8 for moving the intermediate plate 2 up and down.

Reference numeral 14 designates a drive gear supported on a shaft 16 provided on the device body side, and this drive gear 14 receives drive from a drive source such as a motor and is normally rotated in the direction of arrow B in FIG. 3. Reference numeral 16 denotes an electromagnetic clutch for controlling the transmission of the drive to the paper feeding roller, and the drive gear 14 is in meshing engagement with the gear 16*a* of the electromagnetic clutch 16 and transmits rotative drive to the gear 16*a*. By the electromagnetic clutch 16 being energized, the rotation of the gear 16*a* is transmitted to the paper feeding shaft 6, whereby the feeding roller 4 is rotated, and when the electromagnetic clutch 16 is deenergized, the rotation of the gear 16*a* is not transmitted to the paper feeding shaft 6 and the transmission of the rotative drive to the paper feeding roller 4 is cut off.

Reference numeral 18 designates a cam gear supported coaxially with the shaft of the electromagnetic clutch 16, and this cam gear 18 and the cam 8 are formed integrally with each other. The cam gear 8 is formed with a depression 8*a* having a radius larger than the radius of the roller 2*a* provided on the intermediate plate 2, and the intermediate plate 2 is maintained in its lowered position when this depression 8*a* and the roller 2*a* are engaged with each other.

Reference numeral 20 denotes a partly untoothed gear having an untoothed portion 20*a*, and when the gear 20 of the partly untoothed gear 20 meshes with the gear 16*a* of the electromagnetic clutch 16 which is in meshing engagement with the drive gear 14 and is normally rotating, the rotation is transmitted to the partly untoothed gear 20. Also, then the partly untoothed gear 20 meshes with the cam gear 18, the rotation is transmitted from the partly untoothed gear 20 to the cam gear 18. Accordingly, when the untoothed portion 20*a* of the partly untoothed gear 20 is opposed to the gear 16*a* of the electromagnetic cluch 16 and the cam gear 18, the transmission of the rotation is not effected.

Description will now be made of regulating means for stopping the partly untoothed gear 20 in a position wherein the untoothed portion 20*a* is opposed to the gear 16*a* and the cam gear 18.

The partly untoothed gear 20 is integrally provided with a restraining projection 20*d* engageable a pawl portion 22*b* provided on the movable piece 22*a* of a solenoid 22, and by the pawl portion 22*b* and the restraining projection 20*d* being engaged with each other, the partly untoothed gear 20 is stopped in a state in which the untoothed portion 20*a* thereof is opposed to the gear 16*a* of the electromagnetic clutch 16 and the cam gear 18. The solenoid 22 has its movable piece 22*a* biased by a tension spring 24 so that during the non-energization thereof, the pawl portion 22*b* may be engaged with the restraining projection 20*d*, and by being energized, the movable piece 22*a* is attracted and moved so that the pawl portion 22*b* may come out of engagement with the restraining projection 20*d*. Also the partly untoothed gear 20 is rotatively biased in the direction of the arrow C of FIG. 3 by a leaf spring 26, and when the pawl portion 22*b* of the solenoid 22 has come out of engagement with the restraining projection 20*d*, the partly untoothed gear 20 is rotated so as to mesh with the gear 16*a* of the electromagnetic clutch 16 and the cam gear 18.

The shape of the partly untoothed gear 20 characterizing the present invention will now be described in detail with reference to FIGS. 7 to 9.

The drive gear 14 and the gear 16*a* of the electromagnetic clutch 16 have a generally used tooth shape such as that of an involute gear. The partly untoothed gear 20 and the cam gear 18 are improved in the shape of some of their teeth over the tooth shape such as that of the involute gear.

The partly untoothed gear 20 is formed by a first portion 20*b* meshing with the gear 16*a* of the electromagnetic clutch 16 and a second portion 20*c* meshing with the cam gear 18.

Figure 7:
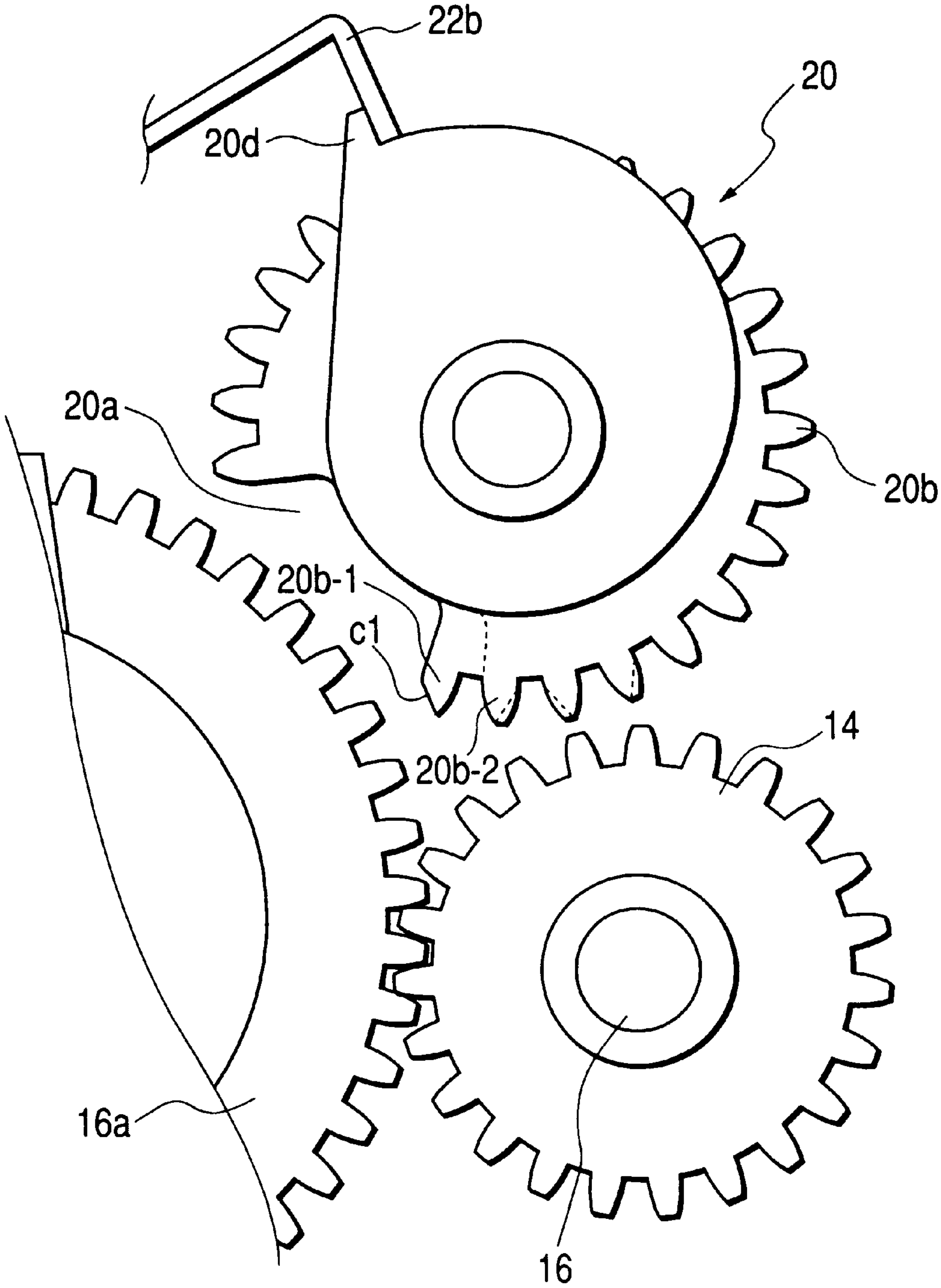
FIG. 7 shows the details of the shapes of the teeth of the gears of the drive transmitting device of FIG. 3.

As shown in FIG. 7, the first portion 20*b* is such that the first tooth 20*b*-1 starting the meshing engagement from the untoothed portion 20*a* is formed with an inclined surface C1 cut away from the root of the front tooth surface in the direction of rotation toward the tooth top of the rear tooth surface. By this inclined surface C1, the reliable meshing engagement with the gear 16*a* can be effected as already described with respect to the prior art.

Here, the tooth surface refers to the surface on which the teeth of the gears meshing with each other bear against each other, the front tooth surface in the direction of rotation is the surface in a tooth which is positioned at the downstream side in the direction of rotation, and the rear toothed surface in the direction of rotation is the surface which is positioned at the upstream side in the direction of rotation.

As indicated by the broken line in FIG. 7, the second portion 20*c* is such that the first tooth 20*c*-1 starting the meshing engagement from the untoothed portion 20*a* begins from a position corresponding to the second tooth 20*b*-2 of the first portion 20*b*.

Figure 8:
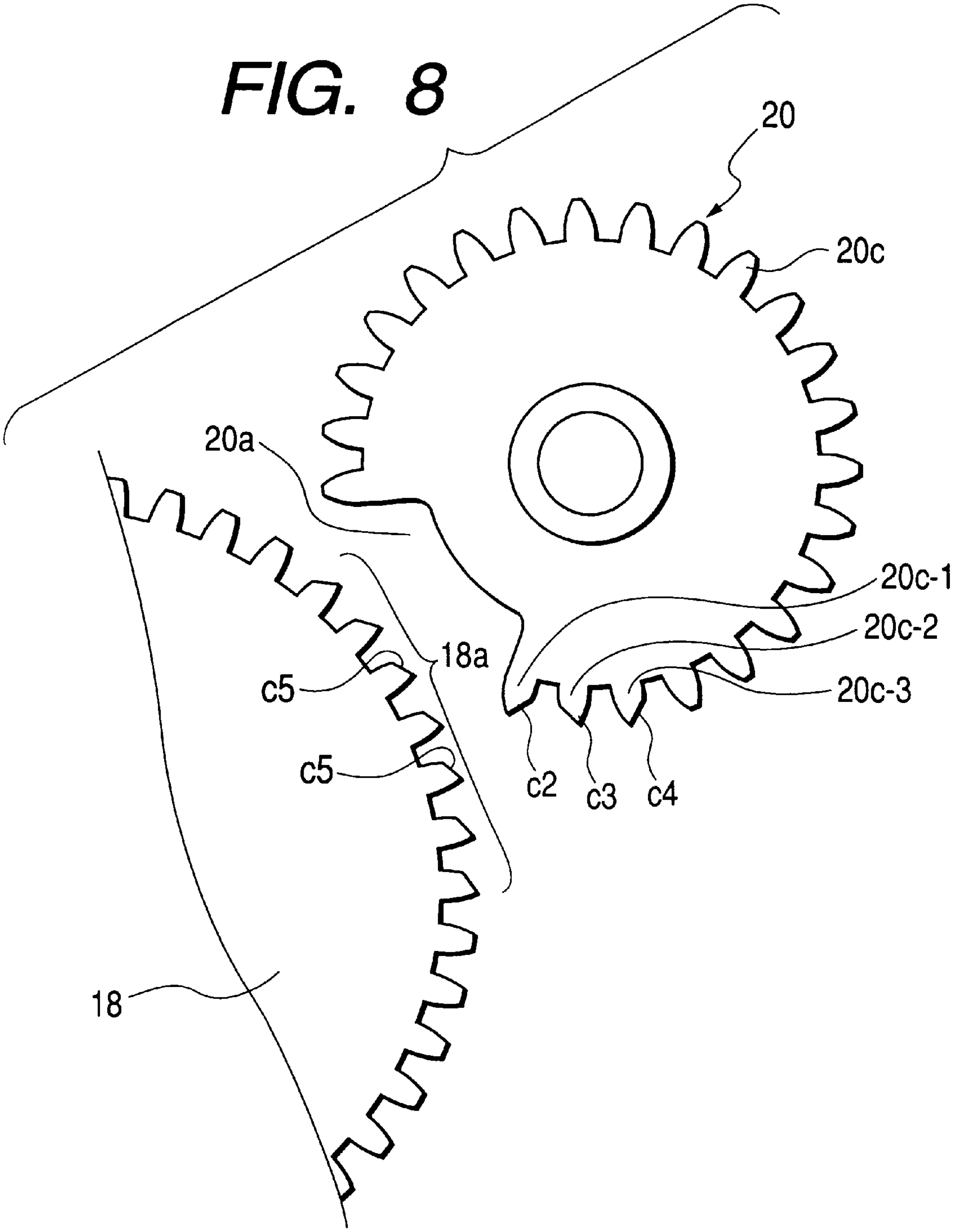
FIG. 8 shows the details of the shapes of the teeth of the gears of the drive transmitting device of FIG. 3.
Figure 9:
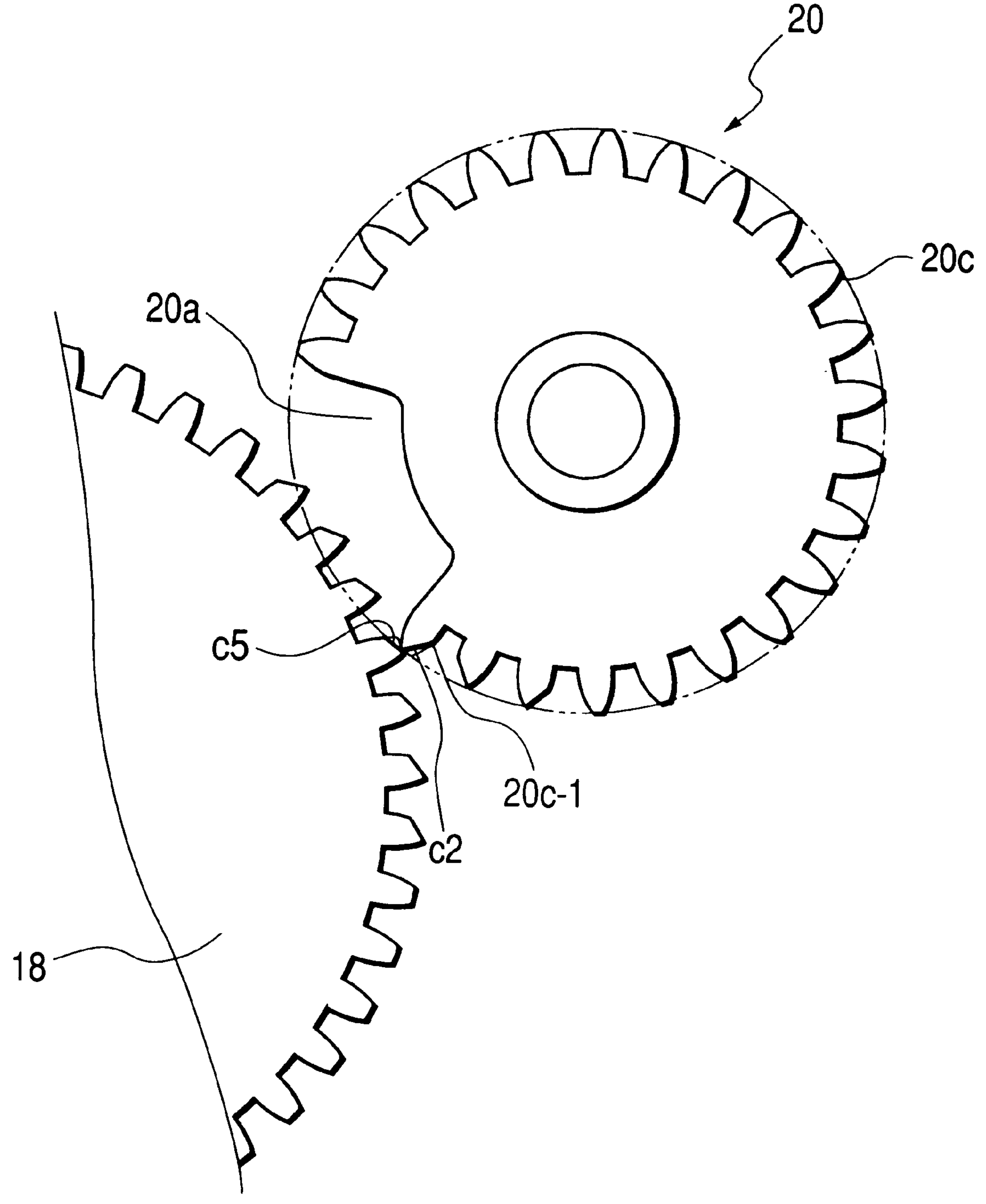
FIG. 9 shows the details of the shapes of the teeth of the gears of the drive transmitting device of FIG. 3.

As shown in FIG. 8, the first tooth 20*c*-1 is formed with an inclined surface (odd tooth inclined surface) C2 cut away from the tooth top of the front tooth surface in the direction of rotation toward the root of the rear tooth surface, and the second tooth 20*c*-2 is formed with an inclined surface (even tooth inclined surface) C3 cut away from the root of the front tooth surface in the direction of rotation toward the tooth top side of the rear tooth surface. The third tooth 20*c*-3, like the first tooth, is formed with an inclined surface C4 cut away from the tooth top of the front tooth surface in the direction of rotation toward the root of the rear tooth surface.

Regarding the subsequent teeth as well, the odd teeth each may be formed with an inclined surface cut away from the tooth top of the front tooth surface in the direction of rotation toward the root of the rear tooth surface, and the even teeth each may be formed with an inclined surface cut away from the root of the front tooth surface in the direction of rotation toward the tooth of the rear tooth surface. Alternatively, the first tooth may be formed with the inclined surface C1 alone, and the second tooth may be formed with the inclined surface C2 alone.

As shown in FIG. 8, the cam gear 18 is such that several teeth 18*a* before and behind the portion thereof starting the meshing engagement with the partly untoothed gear 20 are formed with inclined surfaces (driven tooth inclined surfaces) C5 each cut away from the root of the front tooth surface in the direction of rotation toward the tooth top of the rear tooth surface. The inclined surfaces C5 each are formed into a shape as shown in FIG. 9 wherein the tip end of the tooth is scraped off so as to escape the range of the rotational locus of the tip end of the first tooth 20*c*-1 of the partly untoothed gear 20. These inclined surface C5 may be partly formed as shown in FIG. 8 or may be formed on all teeth of the cam gear 18.

Figure 10A:
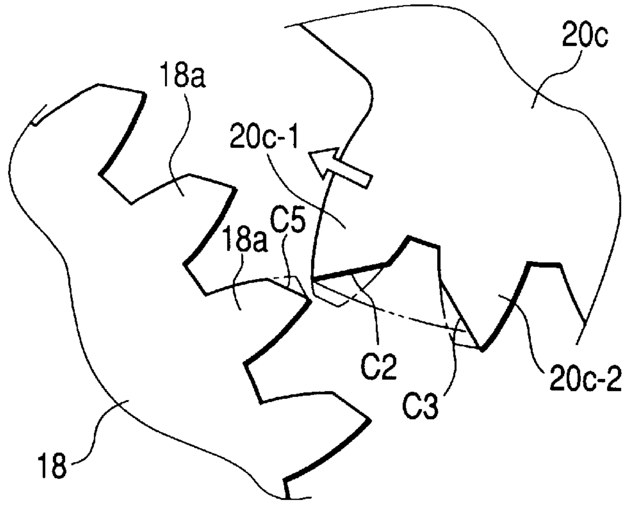
FIGS. 10A, 10B and 10C show a state in which a partly untoothed gear meshes with the cam gear.
Figure 10B:
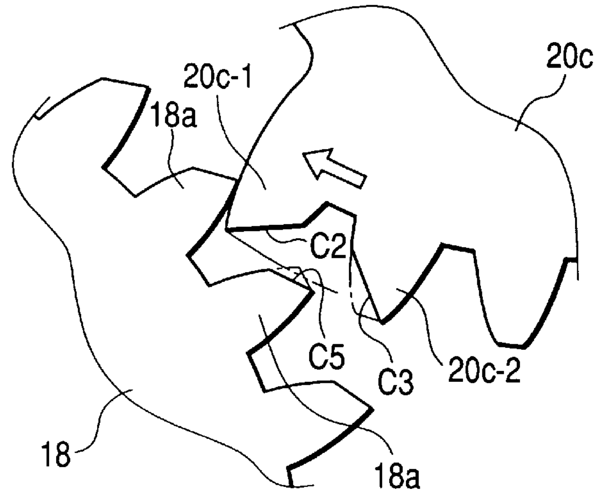
Figure 10C:
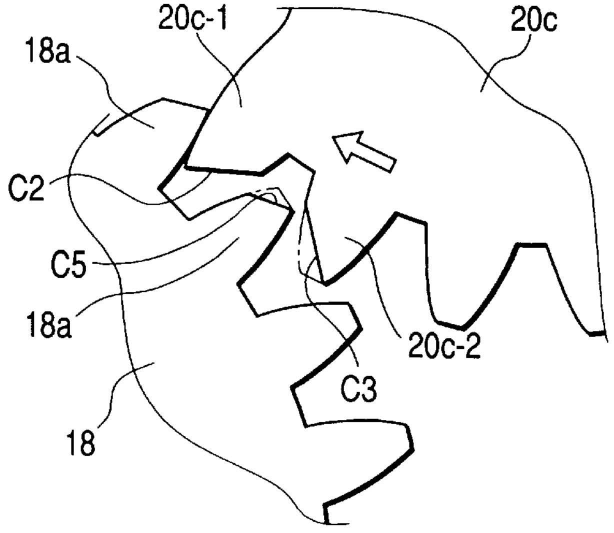

FIGS. 10A, 10B and 10C show a state in which the second portion 20*c* of the partly untoothed gear 20 meshes with the cam gear 18.

The action of the above-described construction will now be described.

In the sheet feeding device 1, during non-paper feeding, rotation is transmitted from the drive gear 14 to the gear 16*a* of the electromagnetic clutch 16, but the paper feeding roller 4 is stopped because the electromagnetic clutch 16 is put OFF. Also, the solenoid 22 is in its non-excited state and therefore, the pawl portion 22*b* of the movable piece 22*a* is engaged with the restraining projection 20*d* of the partly untoothed gear 20 and the partly untoothed gear 20 is topped with the untoothed portion 20*a* thereof opposed to the gear 16*a* of the electromagnetic clutch 16 and the cam gear 18. The cam 8 lowers the intermediate plate 2 against the resilient force of the paper feeding spring and spaces the sheets S piled on the intermediate plate 2 apart from the paper feeding roller 4. Also, the cam 8 has its depression 8*a* engaged by the roller 2*a* of the intermediate plate 2 and has its rotation regulated thereby.

During paper feeding, the electromagnetic clutch 16 is energized at predetermined timing on the basis of a paper feeding signal and the paper feeding roller 4 is rotated, and when the solenoid 22 is excited at predetermined timing, the pawl portion 22*b* comes out of engagement with the restraining projection 20*d* and the partly untoothed gear 20 is rotated by the leaf spring 26, and the first tooth 20*b*-1 of the first portion 20*b* comes into meshing engagement with the gear 16*a* of the electromagnetic clutch 16, whereby the transmission of rotation is started. At this time, as previously described, stable meshing engagement is reliably effected by the inclined surface C1 formed on the first tooth 20*b*-1 of the first portion 20*b*.

Subsequently, the second portion 20*c* of the partly untoothed gear 20 and the cam gear 18 start to mesh with each other and the cam gear 18 is rotated, whereby the cam 8 is rotated and the roller 2*a* comes out of the depression 8*a* and the intermediate plate 2 is moved up by the paper feeding spring. Thereby, the sheets S supported on the intermediate plate 2 are urged against the paper feeding roller 4 and are fed out. The sheets thus fed out are separated one by one by the separating pad 10.

The stopped position of the cam gear 18 is determined by the engagement between the depression 8*a* of the cam and the roller 2*a* of the intermediate plate 2, but an error arises because the radius of the depression 8*a* is larger than the radius of the roller 2*a*. Therefore, there is a case where immediately before the partly untoothed gear 20 is rotated and comes into meshing engagement with the cam gear 18, the tooth tops of the first tooth 20*c*-1 of the partly untoothed gear 20 and the tooth top of the tooth 18*a* of the cam gear 18 exist at positions close to each other, as shown in FIG. 9, but actually the tooth tops hardly contact with each other because the tooth tops are small due to the inclined surface C2 formed on the first tooth 20*c*-1 of the partly untoothed gear 20 and an inclined surface C5 for escape formed on the tooth 18*a* of the cam gear 18. Thus, the production of an abnormal sound or the damage due to the collision between the tooth tops can be greatly reduced.

Even if the upstream side of the tooth top of the first tooth 20*c*-1 of the partly untoothed gear 20 is at a location near the downstream side of the tooth top of the cam gear 18 when the partly untoothed gear 20 is rotated and comes into meshing engagement with the cam gear 18, the tooth tops of the next tooth of the cam gear 18 does not contact with the tooth top of the second tooth 20*c*-2 of the partly untoothed gear 20 due to the presence of the inclined surface C3 formed on the second tooth 20*c*-2 of the partly untoothed gear 20. That is, an escape is formed between the first tooth 20*c*-1 and the second tooth 20*c*-2 of the partly untoothed gear 20 by the inclined surface C3 and the interval therebetween is widened and therefore, it never happens that the tooth tops of the cam gear 18 contact with the tooth top of the second tooth 20*c*-2.

Further, even if the tooth tops of the cam gear 18 are as close to the tooth top of the second tooth 20*c*-2 of the partly untoothed gear 20 as they contact with the latter when the partly untoothed gear 20 is rotated and comes into meshing engagement with the cam gear 18, it never happens due to the presence of an inclined surface C4 opposite in direction to the inclined surface C3 of the second tooth 20*c*-2 which is formed on the third tooth 20*c*-3 of the partly untoothed gear 20 that the tooth tops of the cam gear 18 contact with the partly untoothed gear.

Thus, even in a state in which during the meshing engagement between the partly untoothed gear 20 and the cam gear 18, the phase of the tooth top deviates and the tooth top may contact, the partly untoothed gear 20 effects three teeth of rotation, whereby the cam gear 18 is forced into ordinary meshing engagement and thereafter, the transmission of rotation in a right state is effected. Accordingly, even when rotation is transmitted from the partly untoothed gear 20 to the cam gear 18, the tooth tops thereof do not contact with each other and the stable and reliable transmission of rotation can be effected without a shock sound or the damage of the tooth tops being caused.

Since that portion of the cam gear 18 which starts to mesh with the partly untoothed gear 20 is formed with the inclination C5, it is apt to be damaged when the teeth of the partly untoothed gear 20 collide against it and impart a shock thereto even if the tooth tops do not contact with each other and therefore, such portion may be constructed as follows.

Figure 11:
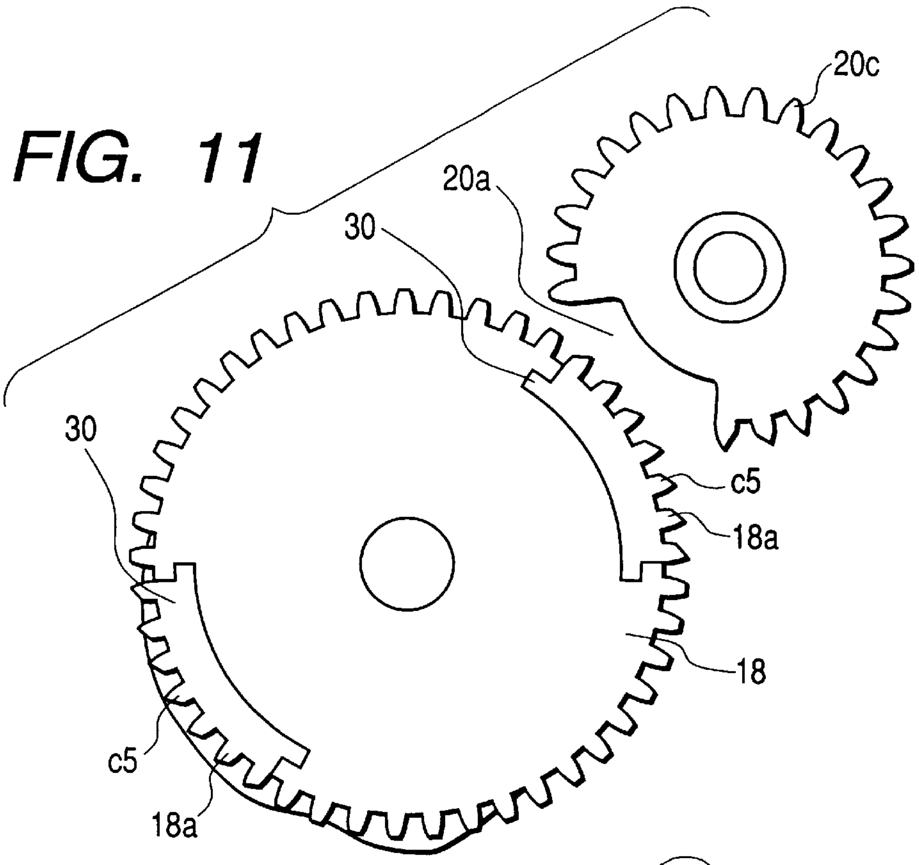
FIG. 11 shows another structure of the driven gear meshing with the partly untoothed gear.

As shown in FIG. 11, in the cam gear 18, a portion 30 having teeth 18*a* formed with inclined surfaces C5 on the tooth tops thereof is provided for sliding in the axial direction of the cam gear 18 so that the portion 30 can be interchanged. Thereby, the repairing work during damaging becomes easy because it is unnecessary to interchange the entire gear, and the maintenance property of the gear is improved. The material of this interchangeable portion 30 may be high in strength.

Figure 12:
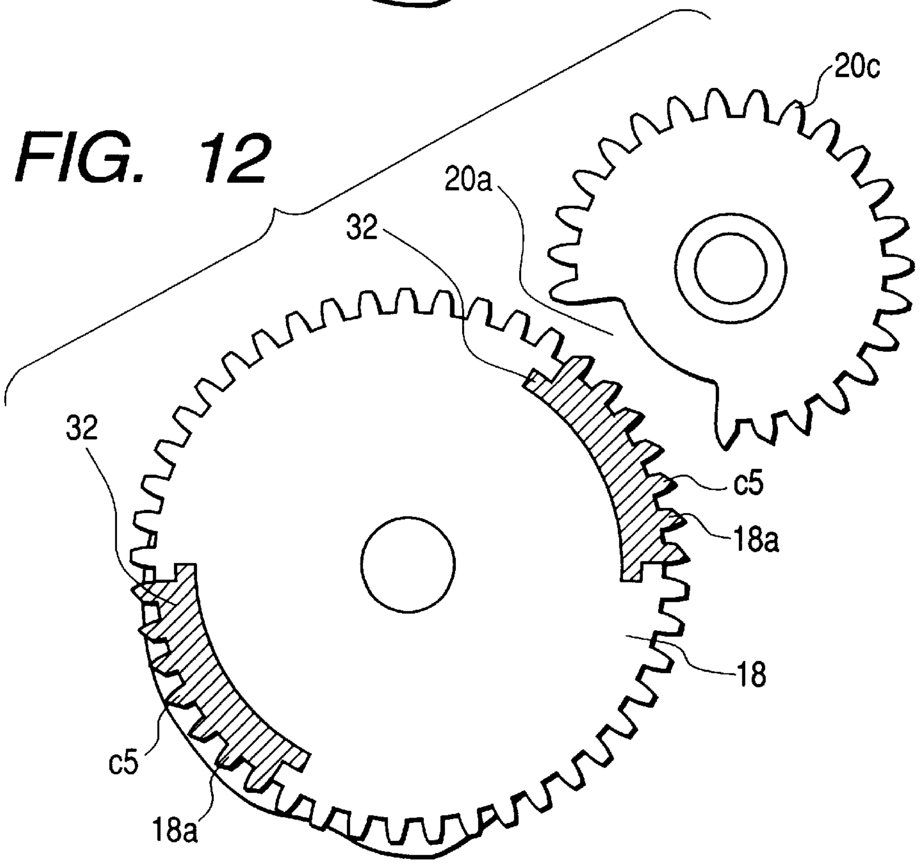
FIG. 12 shows another structure of the driven gear meshing with the partly untoothed gear.

Also, as shown in FIG. 12, in the cam gear 18, portions 32 having teeth 18*a* formed with inclined surfaces C5 on the tooth tops thereof may be formed of a material higher in strength than the other portions by two-color molding. If the whole of the gear is formed of a material of high strength, the cost will become high, but by partly using a material of high strength, an increase in cost can be suppressed and durability can be improved and high reliability can be obtained.

FIGS. 13A to 13C and 14A to 14C show other examples of the shape of the tooth tops of the cam gear and the shape of the tooth tops of the second portion 20*c* of the partly untoothed gear 20.

Figure 13A:
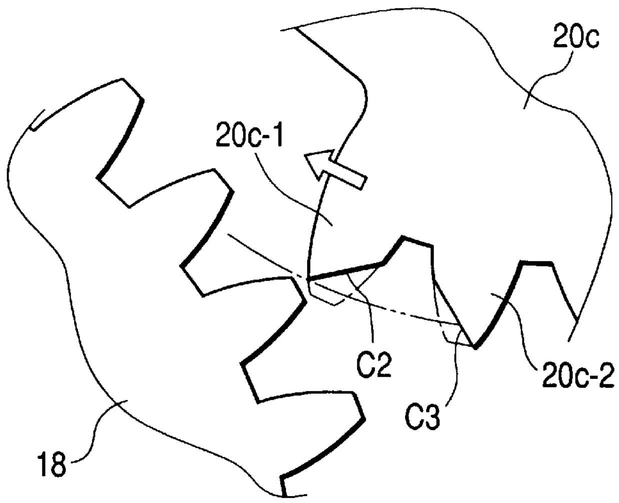
FIGS. 13A, 13B and 13C show another example of the shapes of the tooth tops of the cam gear and the partly untoothed gear.
Figure 13B:
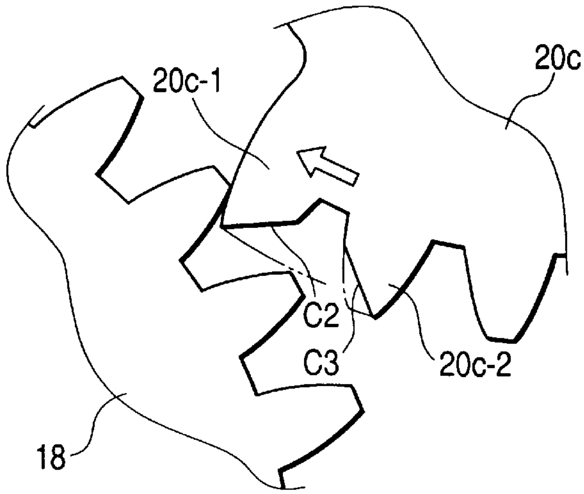
Figure 13C:
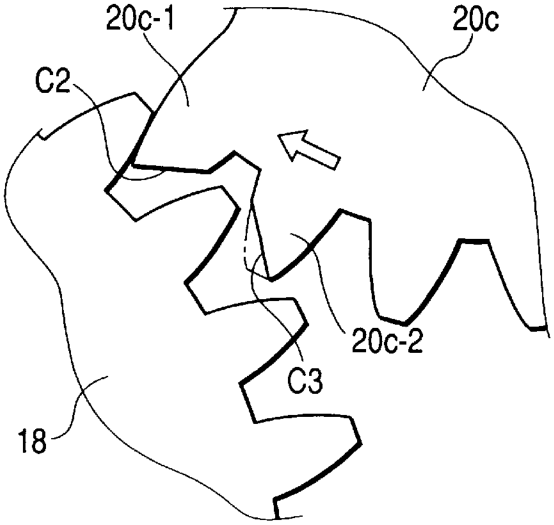

What is shown in FIGS. 13A, 13B and 13C is not formed with the inclined surfaces C5 on the tooth tops of the cam gear 18. The teeth of the second portion 20*c* of the partly untoothed gear 20 are formed with inclined surfaces C2 and C3 as in the above-described embodiment. This construction can also reduce the collision of the tooth tops when the partly untoothed gear meshes with the cam gear.

Figure 14A:
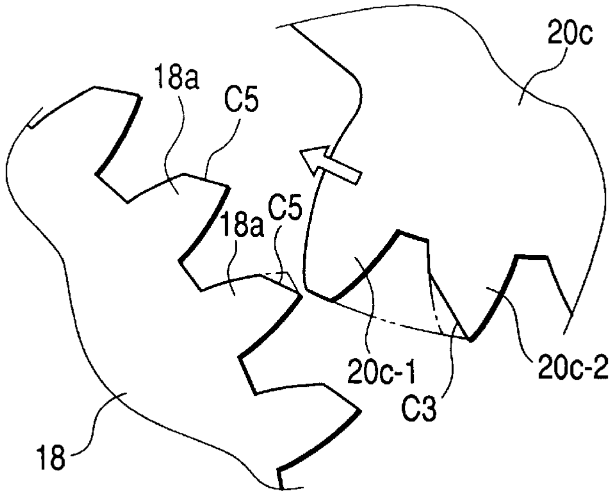
FIGS. 14A, 14B and 14C show another example of the shapes of the tooth tops of the cam gear and the partly untoothed gear.
Figure 14B:
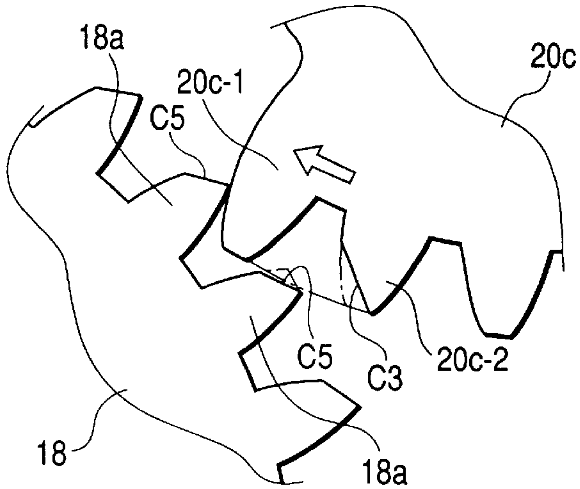
Figure 14C:
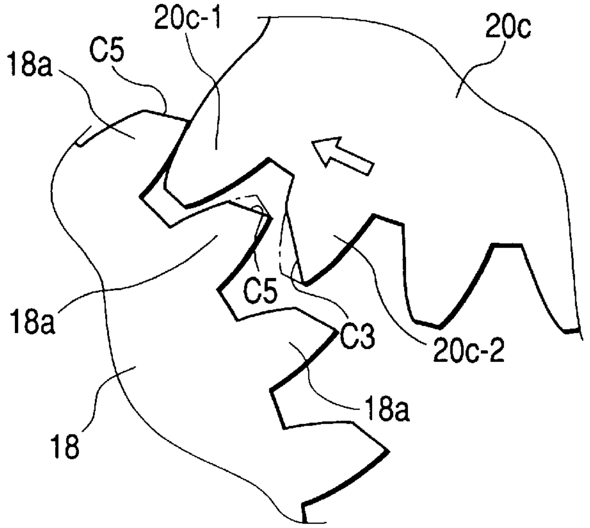

What is shown in FIGS. 14A, 14B and 14C is formed with inclined surfaces C5 on the tooth tops of the cam gear 18, and is not formed with an inclined surface C2 on the tooth top of the first tooth of the second portion 20*c* of the partly untoothed gear 20 but is formed with an inclined surface C3 alone on the tooth top of the second tooth. This construction can also reduce the collision of the tooth tops when the partly untoothed gear meshes with the cam gear.

While the embodiment of the present invention has been described above, for example, the following modifications are possible in the above-described construction. While in the cam gear, inclined surfaces are formed on the teeth of the portion which starts to mesh with the partly untoothed gear, inclined surfaces may be formed on all teeth. Also, slits may be formed in the inner sides of the teeth of that portion of the partly untoothed gear which starts to mesh with the cam gear so that said teeth may be partly flexed to alleviate any shock.

Also, which in the above-described embodiment, description has been made with respect to the drive transmitting device for transmitting rotation to the cam for moving the intermediate plate up and down, a drive transmitting device of similar construction may be used instead of the electromagnetic clutch in the above-described embodiment so as to control the rotation of the paper feeding roller. Further, this drive transmitting device may be used so as to control the rotation of both of the cam and the paper feeding roller.

Figure 15:
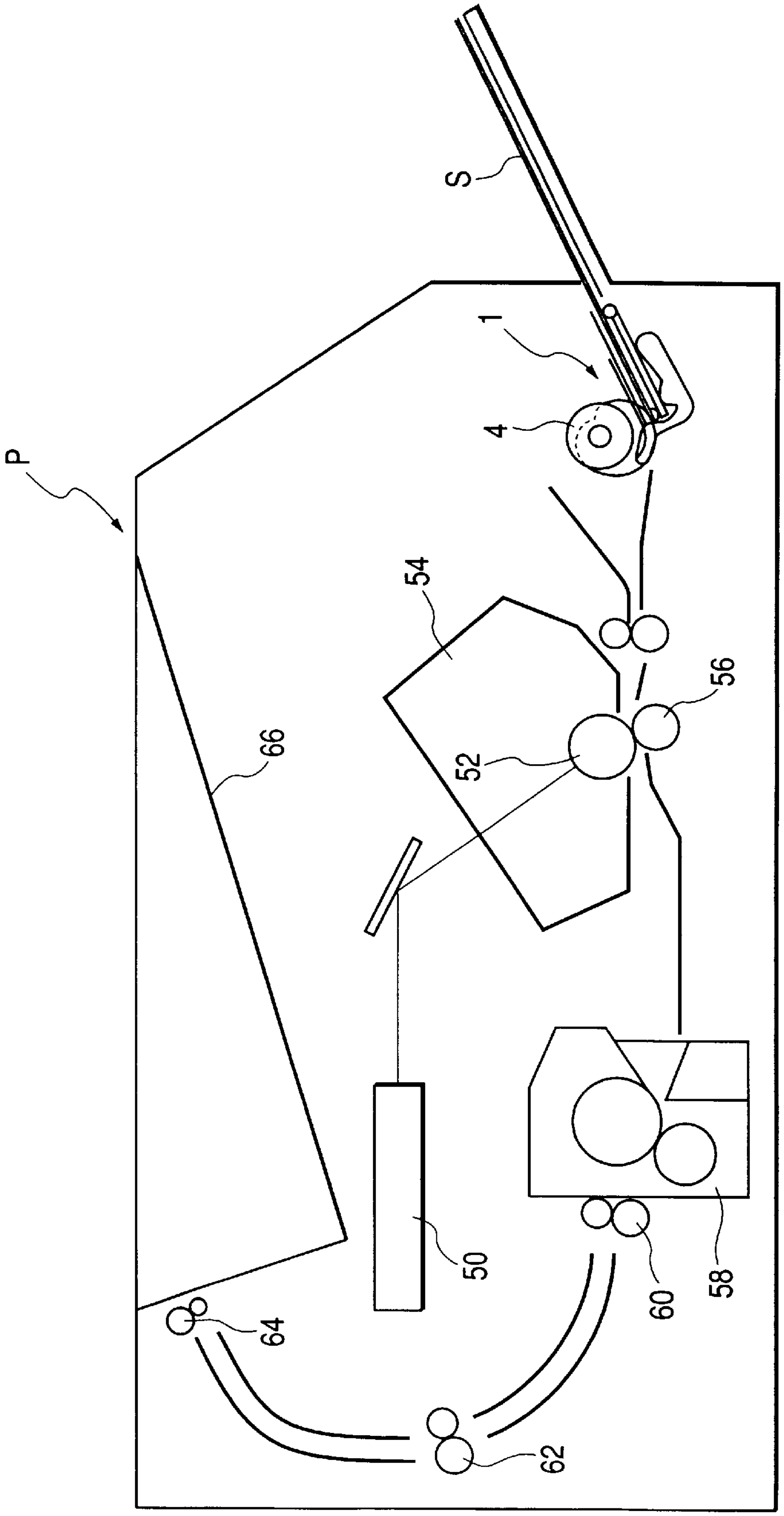
FIG. 15 shows an embodiment of an image forming apparatus provided with the sheet feeding device of the present invention.
Figure 16:
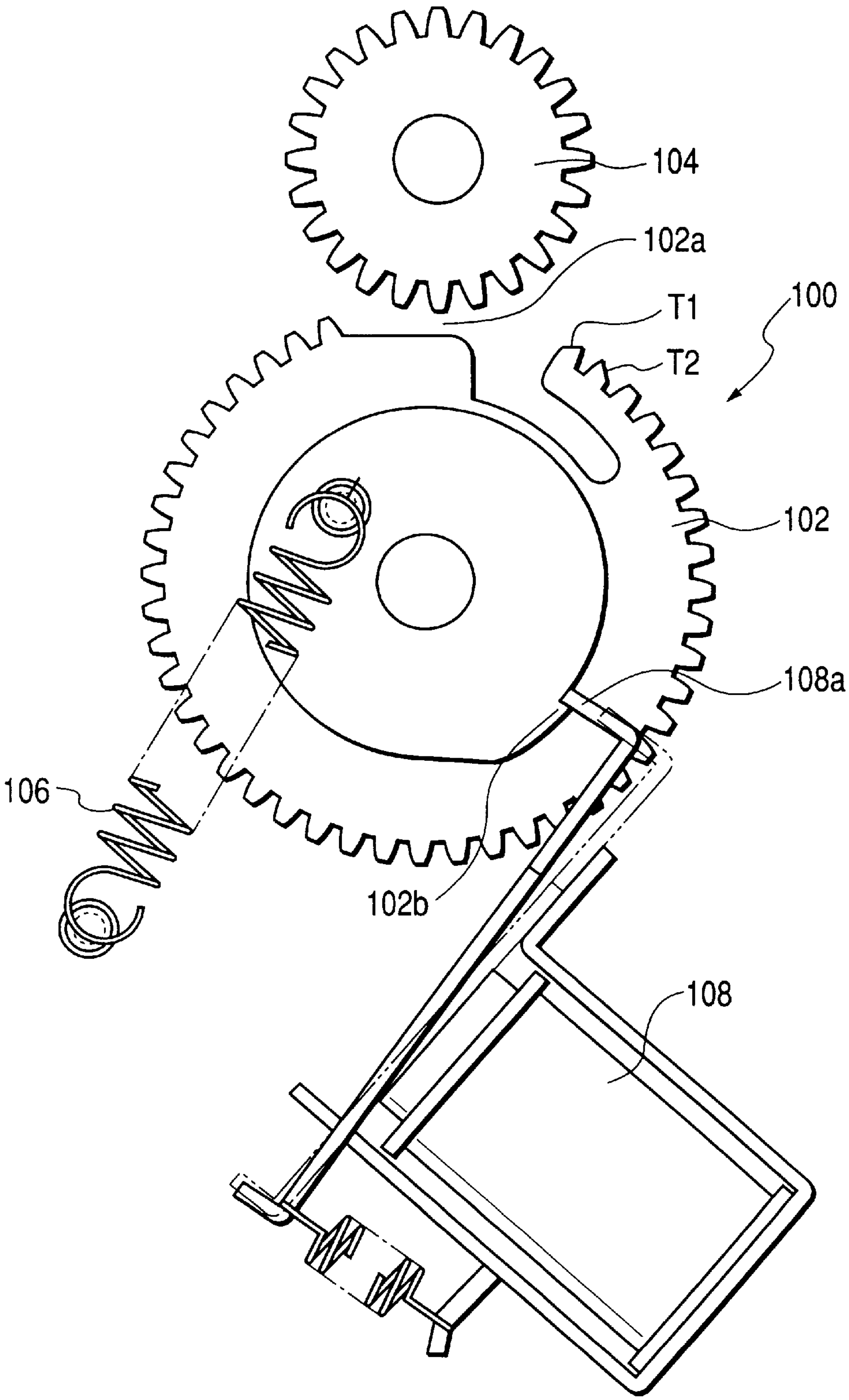
FIG. 16 is a front view showing an example of the drive transmitting device according to the prior art.

An image forming apparatus P provided with the sheet feeding device, of the above-described construction will now be schematically described with reference to FIG. 15. This image forming apparatus P is a laser beam printer in which a scanner unit 50 applies a laser to a transfer drum 52 on the basis of information from a host computer, not shown. The transfer drum 52 is disposed in a drum cartridge 54, and a toner image is formed by the conventional electrophotographic process, and this toner image is transferred to a sheet fed out from the sheet feeding device 1, by a transfer roller 56.

The sheet to which the toner image has been transferred is heated and pressed by a fixating unit 58, whereby the image is fixated. The sheet on which the image has been formed in this manner is discharged onto a paper discharge tray 66 by a pair of conveying rollers 60 and 62, a discharge roller 64, and so on.

What is claimed is:

1. A drive transmitting device comprising a partly untoothed gear having an untoothed portion, and a driven gear adapted to mesh with said partly untoothed gear, for transmitting rotation from said partly untoothed gear to said driven gear, wherein in a predetermined number of continuous teeth of said partly untoothed gear positioned on an area on which said partly untoothed gear starts to mesh with said driven gear when said partly untoothed gear rotates from a state in which the untoothed portion and said driven gear are opposed to each other, each of odd teeth from the untoothed portion is formed with odd tooth inclined surface cut away from the tooth top of the front tooth surface in the direction of rotation of the partly untooth gear toward the root of the rear tooth surface so that a configuration of the rear tooth surface of the odd teeth in the predetermined number of continuous teeth is different from a configuration of the rear tooth surface of teeth other than the predetermined number of continuous teeth, and each of even teeth is formed with even tooth inclined surface cut away from the root of the front tooth surface in the direction of rotation toward the tooth top of the rear tooth surface so that a configuration of the front tooth surface of the even teeth in the predetermined number of continuous teeth is different from a configuration of the front tooth surface of teeth other than the predetermined number of continuous teeth.

2. A drive transmitting device according to claim 1, wherein the teeth of said driven gear are formed with driven tooth inclined surfaces cut away from the root of the front tooth surface in the direction of rotation toward the tooth top of the rear tooth surface.

3. A drive transmitting device according to claim 2, wherein said driven tooth inclined surfaces are formed only on the teeth near the portion of said driven gear which starts to mesh with said partly untoothed gear.

4. A drive transmitting device according to any one of claims 1 to 3, further comprising regulating means for stopping said partly untoothed gear at a position whereat said untoothed portion is opposed to said driven gear; and biasing means for rotating biasing said partly untoothed gear so as to mesh with said driven gear when the regulation by said regulating means is released.

5. A drive transmitting device according to claim 3, wherein the portion of those teeth of said driven gear which are formed with the driven tooth inclined surfaces is formed as a discrete body and is removably mountable on the driven gear.

6. A drive transmitting device according to claim 3, wherein the portion of those teeth of said driven gear which are formed with the driven tooth inclined surfaces is formed of a material higher in strength than the other portions.

7. A drive transmitting device comprising a partly untoothed gear partly having an untoothed portion, and a driven gear adapted to mesh with said partly untoothed gear, for transmitting rotation from said partly untoothed gear to said driven gear, wherein in a predetermined number of continuous teeth of said partly untoothed gear positioned on a side on which said partly untoothed gear starts to mesh with the driven gear when said partly untoothed gear rotates from a state in which the untoothed portion and said driven gear are opposed to each other, each of even teeth from the untoothed portion side is formed with even tooth inclined surface cut away from the root of the front tooth surface toward the tooth top of the rear tooth surface so that a configuration of the front tooth surface of the even teeth in the predetermined number of continuous teeth is different from a configuration of the front tooth surface of teeth other than the predetermined number of continuous teeth, and the teeth of said driven gear are formed with driven tooth inclined surface cut away from the root of the front tooth surface in the direction of rotation toward the tooth top of the rear tooth surface.

8. A drive transmitting device according to claim 7, wherein said driven tooth inclined surfaces are formed only on the teeth near the portion of said driven gear which starts to mesh with said partly untoothed gear.

9. A drive transmitting device according to claim 7 or 8, further comprising regulating means for stopping said partly untoothed gear at a position whereat said untoothed portion is opposed to said driven gear; and biasing means for rotatively biasing the partly untoothed gear so as to mesh with the driven gear when the regulation by said regulating means is released.

10. A drive transmitting device according to claim 8, wherein the portion of those teeth of said driven gear which are formed with the driven tooth inclined surfaces is formed as a discrete body and is removably mountable on the driven gear.

11. A drive transmitting device according to claim 8, wherein the portion of those teeth of said driven gear which are formed with the driven tooth inclined surfaces is formed of a material higher in strength than the other portions.

12. A sheet feeding device comprising:

an intermediate plate supporting sheets thereon and being movable up and down;

paper feeding means for feeding out the sheets supported on said intermediate plate;

a rotatable cam for moving said intermediate plate up and down; and drive transmitting means for transmitting rotation to said paper feeding means and said cam;

wherein said drive transmitting means has:

a driven gear rotated by drive force transmitted thereto;

clutch means for transmitting the rotation of said driven gear to said paper feeding means;

a cam gear provided coaxially with said driven gear for rotating said cam when the rotation is transmitted; and a partly untoothed gear provided in opposed relationship with said driven gear and said cam gear and partly having an untoothed portion, said partly untoothed gear interrupting the drive to said cam gear when the untoothed portion is opposed to said driven gear and said cam gear, but transmitting the drive to said cam gear when said partly untoothed gear meshes with said driven gear.

13. A sheet feeding device according to claim 12, wherein in a predetermined number of continuous teeth of said partly untoothed gear positioned on a side on which said partly untoothed gear starts to mesh with said driven gear when said partly untoothed gear rotates from a state in which the untoothed portion and said driven gear are opposed to each other, each of odd teeth from the untoothed portion is formed with odd tooth inclined surface cut away from the tooth top of the front tooth surface in the direction of rotation toward the root of the rear tooth surface so that a configuration of the rear tooth surface of the odd teeth in the predetermined number of continuous teeth is different from a configuration of the rear tooth surface of teeth other than the predetermined number of continuous teeth, and each of even teeth is formed with even tooth inclined surface cut away from the root of the front tooth surface in the direction of rotation toward the tooth top of the rear tooth surface so that a configuration of the front tooth surface of the even teeth in the predetermined number of continuous teeth is different from a configuration of the front tooth surface of teeth other than the predetermined number of continuous teeth.

14. A sheet feeding device according to claim 12, wherein in a predetermined number of continuous teeth of said partly untoothed gear positioned on a side on which said partly untoothed gear starts to mesh with said driven gear when said partly untoothed gear rotates from a state in which the untoothed portion and said driven gear are opposed to each other, each of even tooth from the untoothed portion is formed with even tooth inclined surface cut away from the root of the front tooth surface toward the tooth top of the rear tooth surface so that a configuration of the front tooth surface of the even teeth in the predetermined number of continuous teeth is different from a configuration of the front tooth surface of teeth other than the predetermined number of continuous teeth, and the teeth of driven gear are formed with driven tooth inclined surfaces cut away from the root of the front tooth surface in the direction of rotation toward the tooth top of the rear tooth surface.

15. An image forming apparatus comprising:

an intermediate plate supporting sheets thereon and being movable up and down;

paper feeding means for feeding out the sheets supported on said intermediate plate;

a rotatable cam for moving said intermediate plate up and down;

drive transmitting means for transmitting rotation to said paper feeding means and said cam; and image forming means for forming images on the sheets fed out by said paper feeding means;

wherein said drive transmitting means has:

a driven gear rotated by drive force transmitted thereto;

clutch means for transmitting the rotation of said driven gear to said paper feeding means;

a cam gear provided coaxially with said driven gear for rotating said cam when the rotation is transmitted; and a partly untoothed gear provided in opposed relationship with said driven gear and said cam gear and partly having an untoothed portion, said partly untoothed gear interrupting the drive to said cam gear when the untoothed portion is opposed to said driven gear and said cam gear, but transmitting the drive to said cam gear when said partly untoothed gear meshes with said driven gear.

16. An image forming apparatus according to claim 15, wherein in a predetermined number of continuous teeth of said partly untoothed gear positioned on a side on which said partly untoothed gear starts to mesh with the driven gear when said partly untoothed gear rotates from a state in which the untoothed portion and said driven gear are opposed to each other, each of odd teeth from the untoothed portion is formed with an odd tooth inclined surface cut away from the tooth top of the front tooth surface in the direction of rotation of the partly untoothed gear toward the root of the rear tooth surface so that a configuration of the rear tooth surface of the odd teeth in the predetermined number of continuous teeth is different from a configuration of the rear tooth surface of teeth other than the predetermined number of continuous teeth, and each of even teeth is formed with even tooth inclined surface cut away from the root of the front tooth surface in the direction of rotation toward the tooth top of the rear tooth surface so that a configuration of the front tooth surface of the even teeth in the predetermined number of continuous teeth is different from a configuration of the front tooth surface of teeth other than the predetermined number of continuous teeth.

17. An image forming apparatus according to claim 15, wherein in a predetermined number of continuous teeth of said partly untoothed gear positioned on a side on which said partly untoothed gear starts to mesh with the driven gear when said partly untoothed gear rotates from a state in which the untoothed portion and said driven gear are opposed to each other, each of even teeth from the untoothed portion is formed with even tooth inclined surface cut away from the root of the front tooth surface toward the tooth top of the rear tooth surface so that a configuration of the front tooth surface of the even teeth in the predetermined number of continuous teeth is different from a configuration of the front tooth surface of teeth other than the predetermined number of continuous teeth, and the teeth of said driven gear are formed with driven tooth inclined surface cut away from the root of the front tooth surface in the direction of rotation toward the tooth top of the rear tooth surface.

* * * * *

UNITED STATES PATENT AND TRADEMARK OFFICE

CERTIFICATE OF CORRECTION

PATENT NO. : 5,944,305

DATED : August 31, 1999

INVENTOR(S): KAZUNORI TAKASHIMA, ET AL.

It is certified that error appears in the above-identified patent and that said Letters Patent is hereby corrected as shown below:

COVER PAGE AT ITEM [56] FOREIGN PATENT DOCUMENTS:
"6-50406 2/1994 Japan" should be deleted.
COLUMN 2:
Line 27, "having $^{a}$n" should be deleted; and
Line 47, "portion" should read --rotation--.
COLUMN 4:
Line 25, "then" should read --when--;
Line 30, "cluch 16" should read --clutch 16--; and
Line 37, "engageable" should read --engageable with--.
COLUMN 5:
Line 52, "surface C5" should read --surfaces C5--.

Signed and Sealed this

Twentieth Day of June, 2000

Attest:

Q. TODD DICKINSON

Attesting Officer

*Director of Patents and Trademarks*